Mar. 27, 1923.
V. G. APPLE.
CURRENT CONTROLLING DEVICE.
FILED JAN. 17, 1919.
1,449,370.
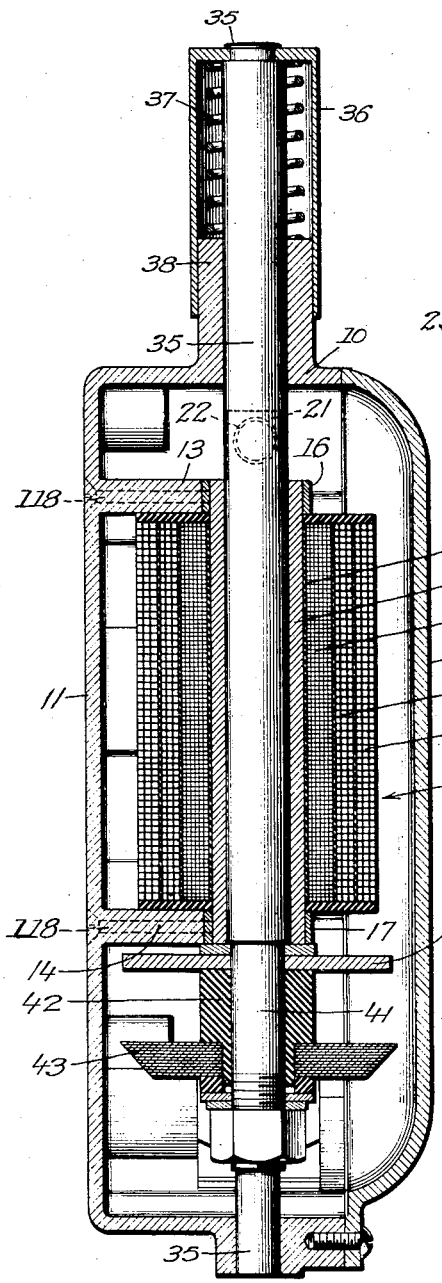
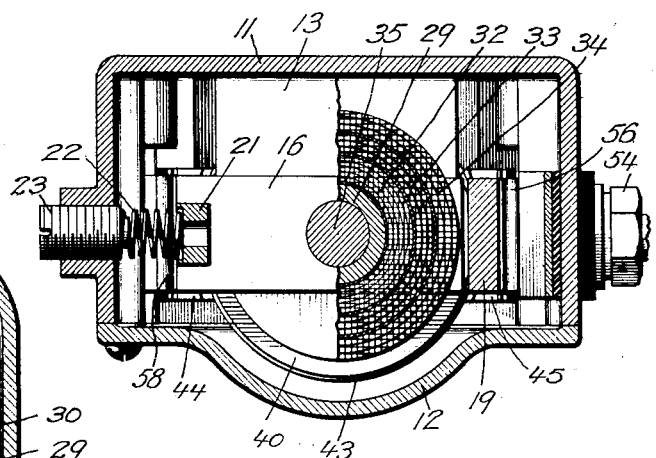
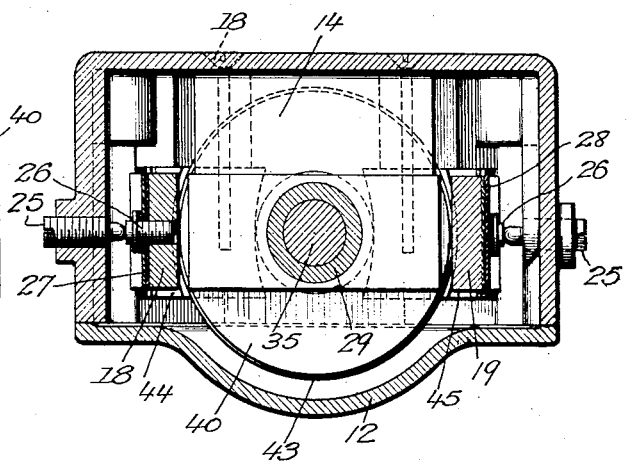
WITNESSES:
Robert H. Weir
Arthur W. Carlson
INVENTOR
Vincent G. Apple
BY
Jones Bain & Rean
ATTORNEY Patented Mar. 27, 1923.

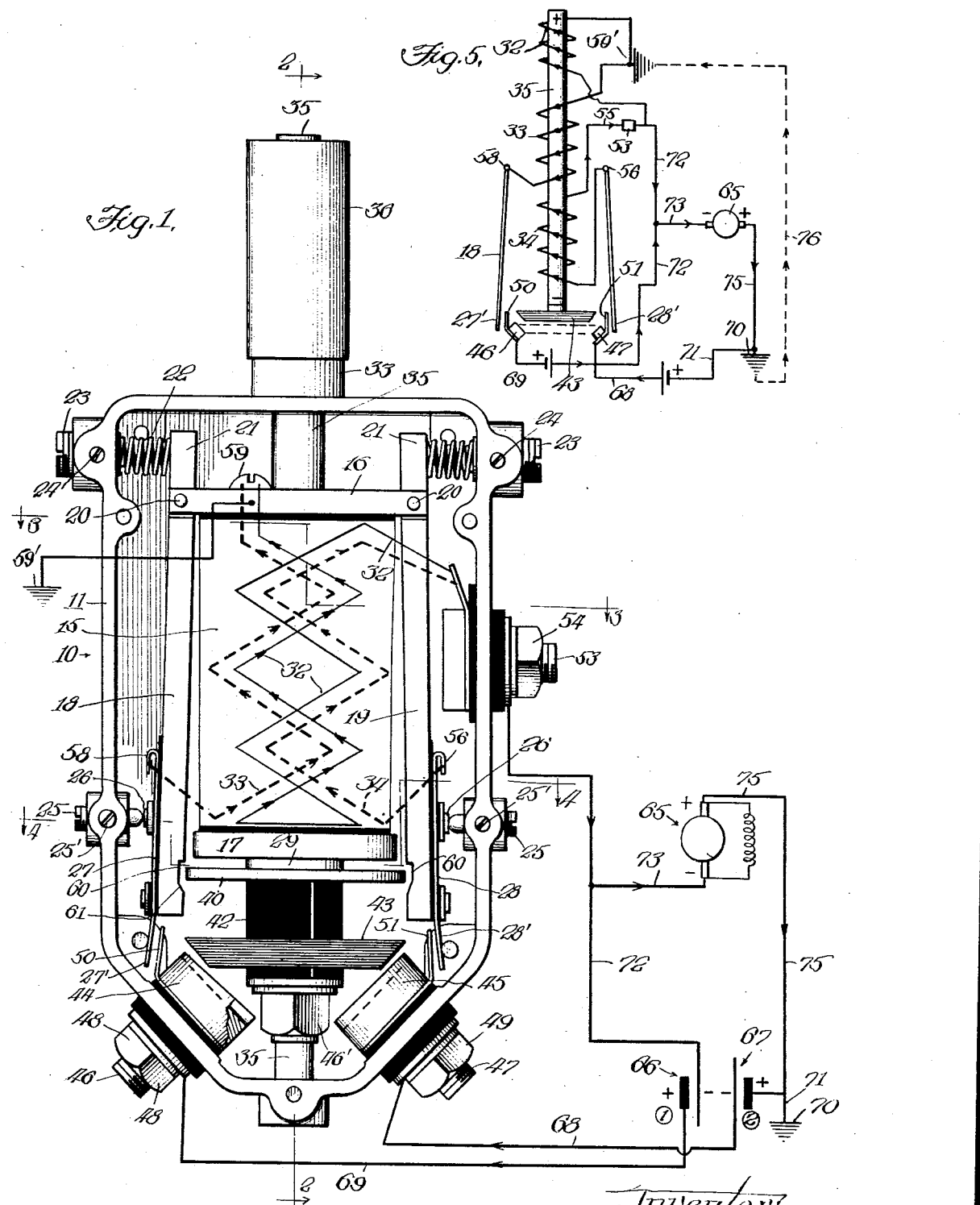

1,449,370

UNITED STATES PATENT OFFICE.

VINCENT G. APPLE, OF DAYTON, OHIO.

CURRENT-CONTROLLING DEVICE.

Application filed January 17, 1919. Serial No. 271,607.

*To all whom it may concern:*

Be it known that I, VINCENT G. APPLE, a citizen of the United States, residing at Dayton, in the county of Montgomery and State of Ohio, have invented certain new and useful Improvements in Current-Controlling Devices, of which the following is a specification.

My invention relates to improvements in current controlling devices.

One of the objects of my invention is to combine in a unitary structure a starting switch, an automatic current regulator and maximum or overload and underload cutout, to be used with a suitable electric equipment for starting internal combustion engines and generating current for the electrical appurtenances used in connection with automobiles.

Another object of my invention is to provide a very simple and cheap-to-construct instrument, that is sensitive in operation, but which is staunch, strong and durable with massive parts and large wearing surfaces.

Other and further objects of my invention will become readily apparent to persons skilled in the art, from a consideration of the following description, when taken in conjunction with the drawings, wherein:—

Fig. 1 is an elevation of the instrument, with the cover removed, showing the circuits as the instrumentalities are connected in actual practice.

Fig. 2 is a section, taken on line 2—2 of Fig. 1.

Fig. 3 is a section, taken on line 3—3 of Fig. 1.

Fig. 4 is a section, taken on line 4—4 of Fig. 1.

Fig. 5 is a simplified diagram of circuits.

I have shown in the diagrams two batteries, of six volts each, and when the dynamo-electric machine, operating as a motor, is energized by the batteries, by the manual closing of the switch, the batteries are thereby preferably connected in series or jointly produce 12 volts, and with the dynamo when functioning as a motor, but when the switch is released and it is automatically controlled in its movement after release, then the batteries are automatically connected in parallel circuit with each other and the dynamo electric machine is then functioning as a generator, to charge the batteries.

I will first describe the preferred structure of a switch embodiment containing my invention and then point out its relation to the other appurtenances associated therewith, and explain its operation.

The unitary structure 10 consists of a casing 11, having a removable cover 12. The switch casing is preferably made of aluminum, or other non-magnetic material, and is provided with two spaced-apart inwardly projecting walls 13 and 14, upon which to support the electro-magnet 15. I have called the electroresponsive device 15 an electromagnet, for brevity, drawing no distinction between an electro-magnet and solenoid, although this structure functions as both. Supported on the cross walls 13 and 14 are two bars of magnetic material 16 and 17, to be magnetically polarized by the coils and held in place by screws 118. The bar 16 is somewhat longer than the bar 17, the upper bar 16 being slotted, at its ends, as more clearly shown in Fig. 3, within which slots the longitudinally extending armatures or bars 18 and 19 are respectively pivoted, as at 20. The armature bars 18 and 19 extend downwardly and confront the polar ends of the short bar 17, and when in substantial contact therewith, close the magnetic circuit of the electro-magnet 15.

The upper end of the armature bars 18 and 19, are each extended above its pivotal point 20, as at 21, to receive an adjustable compression spring 22, adjusted by a screw 23 which is held in adjusted position by another screw 24. The distance that the armature bars 18 and 19 may be permitted to be moved away from the respective ends of the cross bar 17, of the electro-magnet, is adjusted by a screw 25 that is held in adjusted position by another screw 25' on the left of Fig. 1. The inner end of the screw 25 contacts with an insulated screw or projection 26, that is insulated from but passes thru a contact spring 27, and is not in connection therewith. The projection 26, on the right hand side, passes thru a similar contact spring 28 but is not in contact therewith, the projection 26 being insulated, as in the former case and the adjusting screw 25 being held in place by a similar screw 25'. A tube 29 is a support for the windings of the electro-magnet 15 and is secured in the cross bars 16 and 17. It is provided with an insulating covering 30, around which a relatively fine wire coil 32, which is normally in shunt with the dynamo terminals and over the fine coil 32 are two coarse wire coils 33 and 34, of the same number of ampere turns and substantially the same resistance.

An iron core or plunger rod 35 passes thru the central tube 29 and extends above the electro-magnet a considerable distance and on its upper end is provided with a cap 36 which covers an open helical spring 37, the cap having a guiding bearing on a hub 38 that projects upwardly from the casing 11. The plunger rod 35 not only serves as means for manually closing the switch, but acts as a core for the solenoid provided by the windings of the electro-magnet 15, so that when the coils of the magnet are energized the plunger rod 15 is drawn downwardly, for a purpose to be hereafter more fully explained.

A magnetic disc 40 is secured to the lower reduced end 41 of the plunger rod and threaded over the smaller end of the rod is an insulating thimble 42, secured to the lower end of which is an annular, tapered, laminated disc 43, for closing the main circuit thru the terminals 44 and 45, these parts being held on the lower end of the plunger rod 35 by a nut 46'. The cooperating terminals 44 and 45, extend outwardly of the casing and are insulated therein to provide projecting threaded studs 46 and 47 to which wires may be connected by the nuts 48 and 49, respectively. Extending upwardly from the terminals 44 and 45, are terminal plates 50 and 51, respectively. These plates cooperate for closing electric circuits, with the lower end 27' of the plate 27, and the lower end 28' of the plate 28, when the bars 18 and 19 are attracted by the cross bar, or magnetic pole piece 17, against the yielding resistance of the springs 22.

Another threaded terminal stud 53, surrounded by a clamping nut 54, is connected to a wire 55 which leads to the coil 34, the other end of coil 34 being connected, as at 56, to the insulated plate 28 carried by the pivoted armature bar 19. One end of the coil 33 is connected to the plate 27, as at 58, and the other end of the coil 33 is connected to the grounded frame or casing 11, as by a screw 59. Each of the armature bars, 18 and 19, is notched at its lower end, as at 60, so that when these armature bars 18 and 19 are attracted by the magnet pole 17, the notches 60 will permit contact to be made between the contact members 27' and the member 50, and the contact member 28' and the member 51. When the plunger rod 35 is depressed and the disc 40 passes below the notch 60, then the contacts cannot be affected, as described, because the disc 40 will interfere and not permit the armature bars 18 and 19, to move inwardly sufficiently far to make the electric contacts described. The notches 60 are tapered on their lower edge, as at 61, so that if the plunger bar is moved downwardly when the armature bars 18 and 19 are attracted, so that the contacts are made at their lower respective ends, then the disc 40, coming in contact with the tapered surface 61 will push the armature bars 18 and 19 outwardly and break contact at the respective ends with the members 50 and 51 and open the circuits connected by said armature bars.

65 represents a dynamo electric machine, capable of functioning either as a motor, for starting an engine, or as a generator, for generating current for charging the two batteries 66 and 67. Each of these batteries may contain three cells of two volts each or a total of six volts. The negative terminal of battery 2 is connected to the binding stud 47, by a wire 68. The positive terminal of battery 1 is connected by a wire 69, to the binding stud 46. The positive terminal of battery 2 is connected to ground, as at 70, by a wire 71. The negative terminal of battery 1 is connected to the binding stud 53, by a wire 72. The negative side of the dynamo is connected by a wire 73 to the wire 72, or to the stud 53, and the positive terminal of the dynamo is connected to the ground, by a wire 75. In the diagram of circuits, Fig. 5, I have shown the grounds connected together by a dotted line, as at 76.

The operation of the device is substantially as follows:—To start the engine pressure is applied by the foot of the operator, or by hand, to the plunger 35 to depress it against the resilient resistance of the open helical spring 37. This brings the laminated tapered disc 43 into contact with the terminals 44 and 45, which closes the circuit thru the battery, whereupon the current will flow from the positive terminal of battery 1, thru wire 69 to the terminal 46, from thence to the contact terminal 44 over the laminated circuit closing disc 43, to the contact terminal 45, and thru the wire 68 to the negative terminal of battery 2, and thence thru the wire 71 to the ground 70 and from thence by the wire 75 to the positive side of the dynamo, thru the dynamo, operating it as a motor, and then thru the wire 73, back over the wire 72, to the negative side of battery 1, thus including both batteries in series relation with each other and with the dynamo. At this time any current that may flow thru coil 32 will have no effect on the core 35 until foot pressure is removed.

While this is being done the disc 40 has moved below the notches 60 in the armatures 18 and 19 and these armatures therefore cannot make contact with the relatively stationary connecting terminals 50 and 51, but so soon as the operator's foot has been released from the upper end of the plunger rod 35, the spring 37 will automatically restore the parts to substantially the position shown in Fig. 1, whereupon the armatures 18 and 19 will be attracted toward the polarized cross bar 17 of the electro-magnet, and make connection between the contacts 27' and 50 and the contact 28' and 51, respectively, whereupon the circuits will now be as follows:—

The current will now flow in accordance with the direction of the arrows, as shown in Fig. 5. From the positive side of the dynamo, now functioning as a generator, to the positive side of battery 2, thence to the terminal 47 and thru the contact member 28' to one end of the coil 34, thru the coil 34, to the terminal 53, thence back to the negative side of the dynamo. In parallel with this circuit the current will flow from the positive side of the generator to the ground 70 and thence (lower dotted line 76) to the ground 59', thru the coil 33, reinforcing coil 34, and thru the terminal contact plate 27' to the terminal 46 and thence to the positive side of the battery 1, thence back over the wire 72 to the negative side of the dynamo. It will be observed, from an inspection of Fig. 5, that the current passes thru the coils 33 and 34 in the same direction so that they magnetically reinforce each other. The object of having two coils is so that the two branch circuits will be of the same or substantially the same resistance, so that the current that will flow to the two batteries 1 and 2, will be substantially of the same value as the batteries are now in parallel circuit.

Should the current tend to increase above a predetermined value, the magnetic effect of the coils 33 and 34 will draw the upper end of the plunger 35 downwardly so that the disc 40, striking the oblique surfaces 61 of notches 60 in the armatures 18 and 19, will force them outwardly so that they will break their respective electrical connections between the contacts 27' and 50 and 28' and 51. So soon as the separations between these contacts have been effected in the slightest degree, then the magnetic coils 33 and 34 will lose their influence and spring 27 will overcome the pull of coil 32 and restore the plunger and its parts to their normal position, thus maintaining the current substantially constant. If the value of the current is so low at any time that the coils 33 and 34 will not have sufficient magnetic strength to hold the armatures 18 and 19 inwardly so that they will maintain their respective contacts at their lower ends, the circuits will be automatically opened by the effect of the springs 22 overcoming the weakened magnetic effect produced by the coils and therefore the device will operate as a cut-out or circuit opener for a minimum or abnormally small load and it will draw the plunger 35 down and operate in a manner described for an abnormally large load. Increased electro-motive force, beyond a predetermined extent will energize the shunt coil 32 which will have the effect to contribute in pulling down the armature core 35 to open the contacts at the lower ends of the solenoid, in the manner heretofore described. The value of the current, by which these effects are produced is largely to be determined by the tension of the springs 22, which may be adjusted by the screws 23 and the adjustments preserved by the screws 24.

While I have herein shown a single embodiment of my invention, for the purpose of clear disclosure, it is manifest that changes may be made in the configuration and general arrangement of the parts within the scope of the appended claims.

Having described my invention, what I claim is:—

1. A system of the character described for controlling a dynamo electric machine and a plurality of storage batteries, a unitary structure having in combination means to manually close an electric circuit including said dynamo and batteries in series to operate the dynamo as a motor; means to automatically open said circuit when the circuit closing means has been released; an electromagnet having a coil positively held out of circuit by the manual circuit closing means arranged to automatically close a circuit, including said coil, after the first mentioned circuit has been automatically opened and to connect the batteries in parallel by closing said circuit.

2. A system of the character described for controlling a dynamo electric machine and two storage batteries, a unitary structure having in combination means to manually close an electric circuit including said dynamo and batteries in series to operate the dynamo at maximum voltage as a motor; means to automatically open said circuit when the circuit closing means has been released; an electromagnet having a coil positively held out of circuit by the manual circuit closing means arranged to automatically close a circuit including said coil therein and said batteries parallel with each other and with the dynamo after the first mentioned circuit has been automatically opened.

3. A unitary structure having in combination a manually operable switch to close a circuit; an automatic means to open said circuit when the manual means is released; an electromagnet having responsive means and a coil for automatically closing another circuit when the first mentioned circuit is open, said manual means prohibiting the closing of the second mentioned circuit while the first mentioned circuit is closed and a coil, on the said magnet, magnetically assisting the first mentioned coil to maintain the current in the subsequently closed circuit substantially constant in value.

4. In combination with a dynamo electric machine and two batteries, of a unitary current controlling structure, providing a casing; a manually operable switch therein to connect the batteries in series with each other and with the dynamo to operate the dynamo as a motor; a spring operable to automatically open said circuit when the manually operable means is released; an electromagnet in said casing in series with the dynamo operable to connect said batteries in multiple as soon as the first mentioned circuit is opened by said automatic means and another coil, magnetically assisting said first mentioned coil, responsive to variation of voltage of the dynamo and in shunt therewith.

5. In combination with a dynamo electric machine and two batteries, of a unitary current controlling structure providing a casing; an electromagnet therein; a switch operable by said magnet to connect said batteries in multiple with each other and with the dynamo, when the latter is operating as a generator and a manually operable switch arranged to open the first mentioned circuit and to connect said batteries in series with each other and with the dynamo to operate the latter as a motor and automatic means to return said manual switch to its normal position when released.

6. In combination with a dynamo electric machine, a unitary switch structure comprising a casing; an electromagnet in the casing having a coil operable when energized to connect the batteries in multiple circuit with themselves and with the dynamo, another coil, in shunt with the dynamo and responsive to variation of voltage of said dynamo assisting the first mentioned coil and tending to open the circuit closed by the first coil and a manually operable switch arranged to open said circuit and to connect said batteries in series with each other and with said dynamo to operate the latter as a motor.

7. In a current controller, the combination of a casing; an electromagnet therein having suitable windings, a reciprocating axial core and laterally extending pole pieces, one at each end; an armature hinged to one of said pole pieces confronting the other; contacts controlled by the armature to include the windings in circuit when they are connected; contacts controlled by the core and a spring for opening the circuit at the latter contacts and opposing the effect of the windings of the magnet.

In testimony whereof I hereunto subscribe my name.

VINCENT G. APPLE.